Oct. 16, 1934.  C. D. ELLIS ET AL  1,977,508
GEAR MECHANISM
Filed June 22, 1933   3 Sheets-Sheet 1
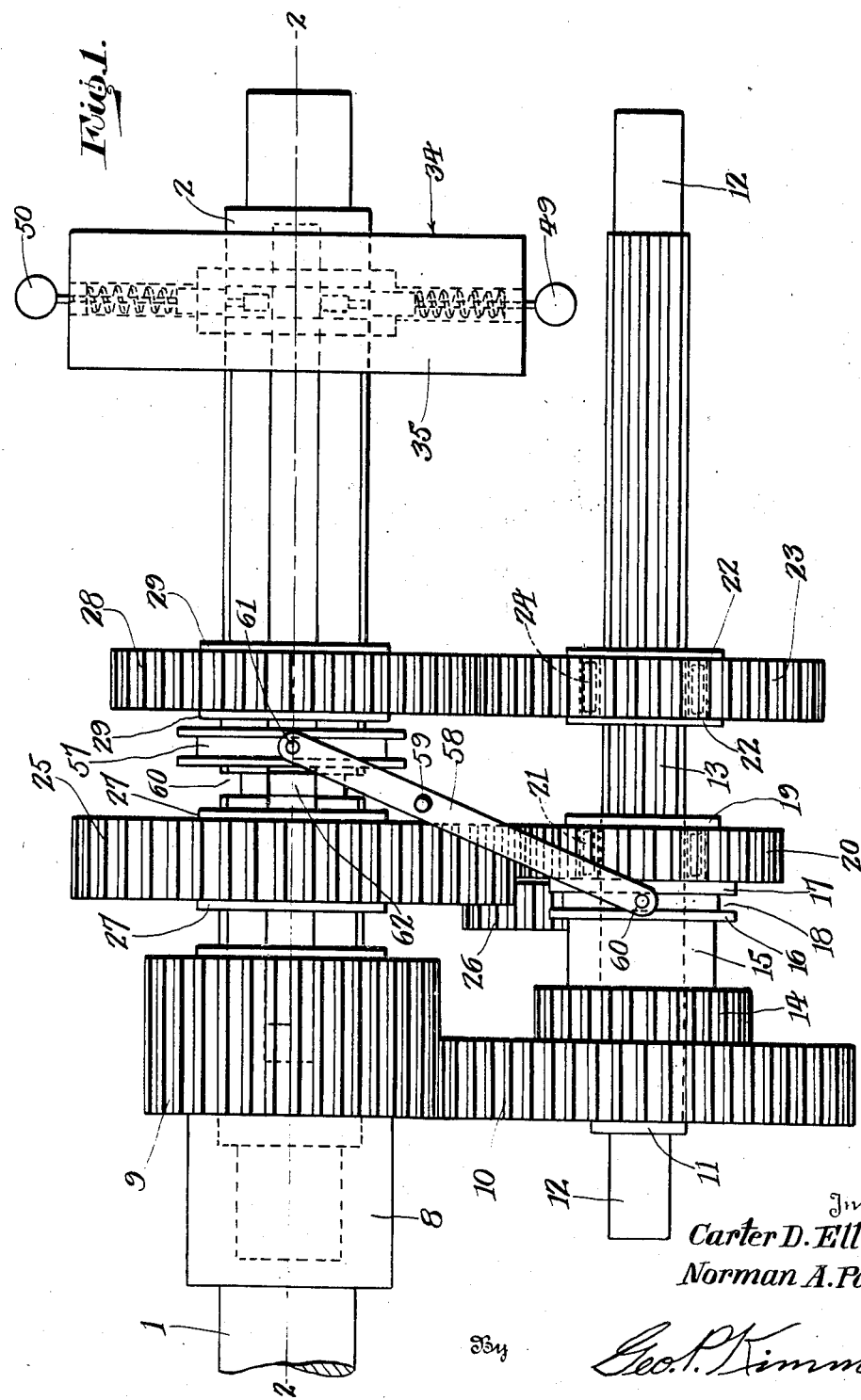
Inventors
Carter D. Ellis
Norman A. Parker
By Geo. P. Kimmel
Attorney

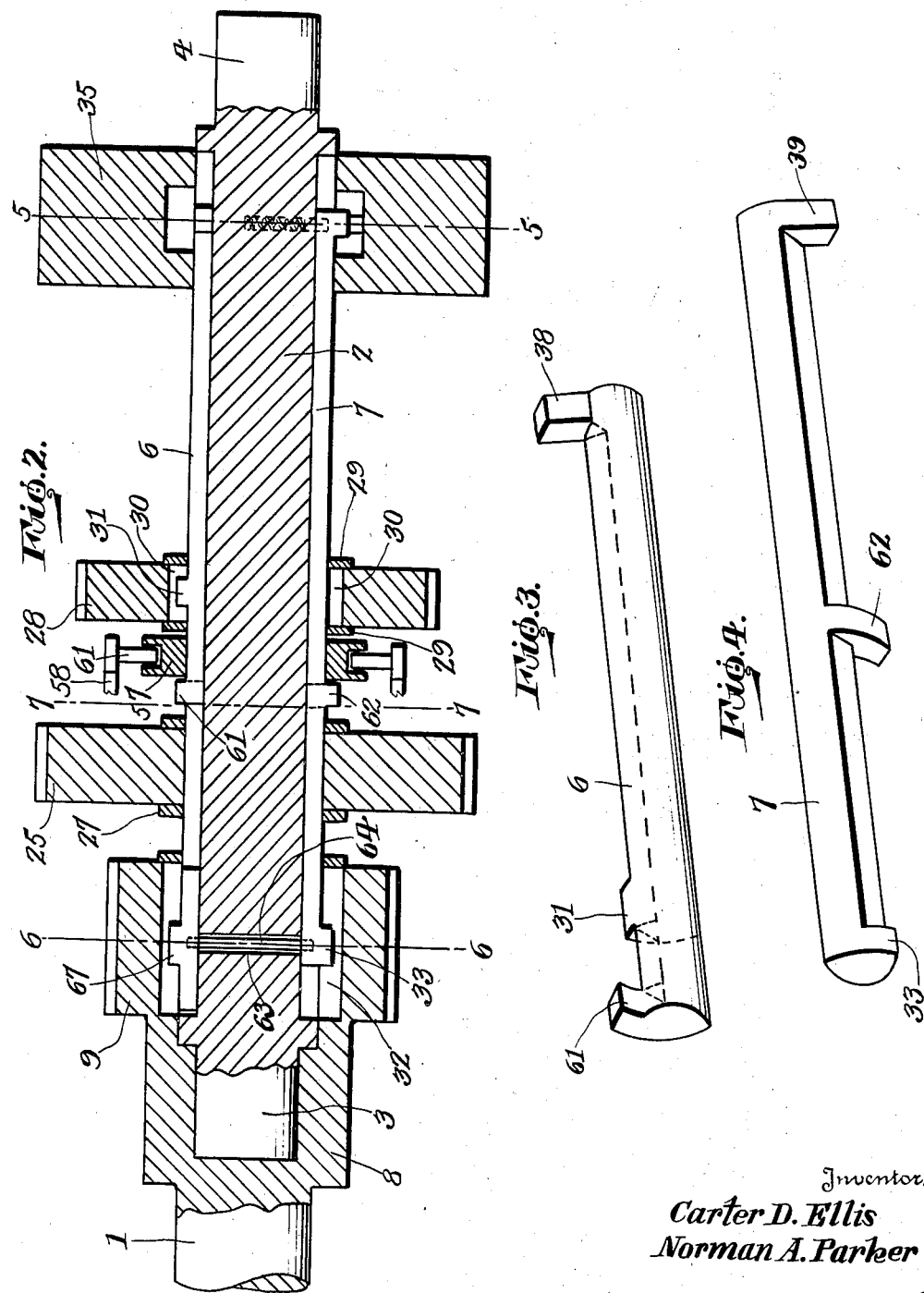

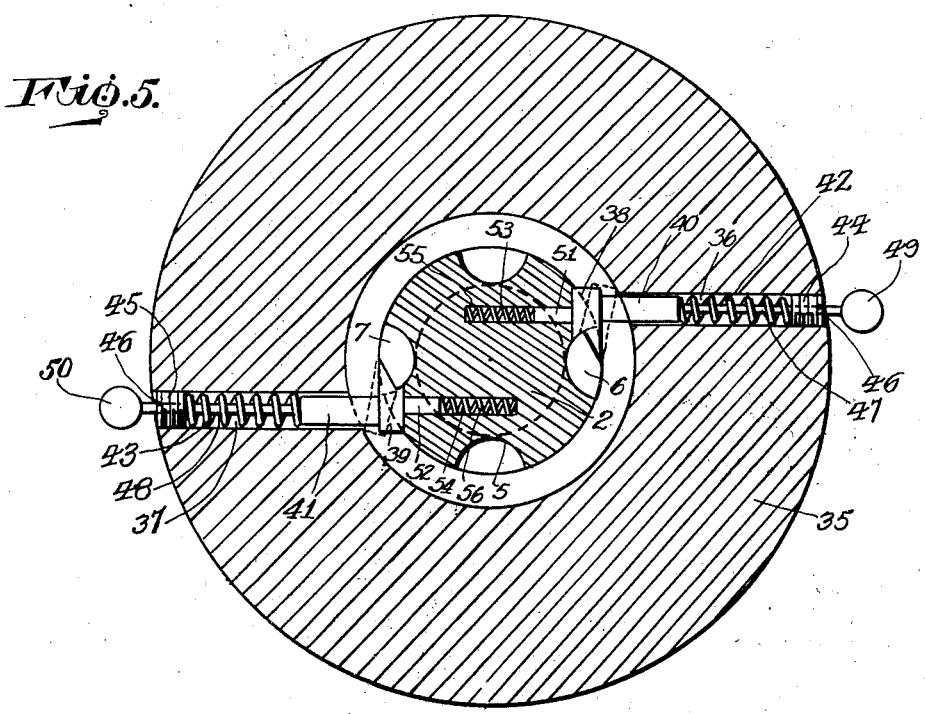
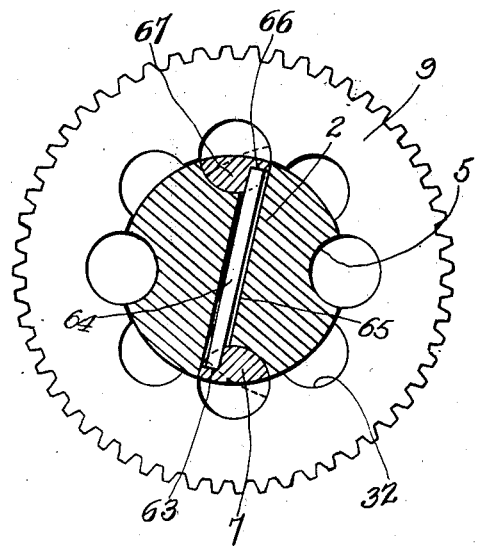
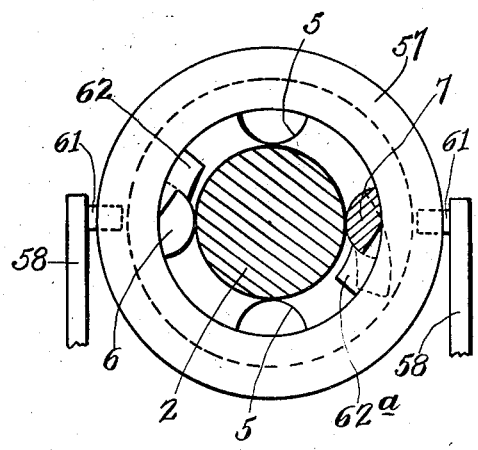

Patented Oct. 16, 1934

1,977,508

UNITED STATES PATENT OFFICE 1,977,508

GEAR MECHANISM

Carter D. Ellis and Norman A. Parker, Erie, Pa.

Application June 22, 1933, Serial No. 677,108

9 Claims. (Cl. 74—336.5)

This invention relates in general to gear mechanism, and more particularly has reference to an automatic change speed gear system of transmission.

In the past, it has been customary to provide systems of gear transmission with a number of various combinations of gears for producing different ratios of speeds between driving and driven shafts, but for the most part these have been manually operated at such time as in the judgment of the operator was proper to change from one speed ratio to another. Some of these have been operated mechanically and some electrically, but in the main they have relied upon the judgment of the operator as to when a sufficient speed was attained for a change in gear ratio. The change in ratio was then effected by the operator through the medium of the mechanical or electrical operating means as the case might be.

Also, in the prior practice, it has been customary to provide for changing gear ratios by means of sliding one set of gears or a number of individual gears so as to engage with different other gears to form different gear ratios while the various parts are in motion.

In the gear mechanisms previously devised for the purpose set forth, there has recently been provided a set of gears for driving the driven shaft in a reverse direction, but it has always been possible in such mechanisms even while the driven shaft was moving forward to mesh the reverse gears or to bring them into contact with each other thus causing serious damage.

It is therefore an object of this invention to provide a gear transmission system for transmitting power at various speed ratios from a driving to a driven shaft depending upon the speed at which the driven shaft is turning, the speed ratio between the driving and driven shafts depending not upon the judgment of the operator but entirely upon the speed of the driven shaft. It is further an object of this invention that all of the gears in mesh during any forward speed of the driven shaft will be in mesh during all forward speeds and that there will be no necessity or possibility of meshing or unmeshing any set of gears during the forward motion of the driven shaft. Furthermore, it is an object of this invention to provide a system of the type set forth with a reverse gearing whereby the driven shaft may be driven in a reverse direction, but provide a means whereby the reverse gearing may not be meshed during the forward operation of the driven shaft.

Other objects and advantages of this invention will become apparent from the following description taken in connection with the accompanying drawings, it being distinctly understood that the same are by way of illustration and example only and are not to be taken as in any way limiting the spirit or scope of this invention. The spirit and scope of this invention is to be limited only by the prior art taken in connection with the accompanying claims.

Referring now more particularly to the drawings in which like numerals indicate corresponding parts throughout:

Figure 1 is a plan view of a gear transmission system embodying this invention.

Figure 2 is a sectional view taken along the line 2—2 of Figure 1.

Figure 3 is a perspective view illustrating the key for controlling the operation of the intermediate shaft.

Figure 4 is a similar view illustrating the key for controlling the operation of the high speed transmission.

Figure 5 is a sectional view taken along the line 5—5 of Figure 2.

Figure 6 is a sectional view taken along the line 6—6 of Figure 2.

Figure 7 is a sectional view taken along the line 7—7 of Figure 2.

In accordance with this invention, the driving shaft 1 is provided at its end with an enlarged portion 8 formed with a socket for receiving the end of the driven shaft 2 and forming a bearing therefor. The driven shaft 2 is provided at its ends with reduced bearing portions 3 and 4, and along its larger portion is provided with longitudinal keyways 5 for the purpose of receiving the keys 6 and 7 the function of which will be presently described.

At the end of the enlarged portion 8 which forms the bearing for the shaft 2, and surrounding the shaft 2 is a jack shaft driving gear 9 adapted to mesh with the driven gear 10 on the jack shaft 11. The jack shaft 11 may be formed with bearing portions 12 at its opposite ends and is splined at 13 from end to end.

The driven gear 10 is made in a unit with a reverse driving gear 14, and with a collar 15 which is provided with radially extending flanges 16 and 17 forming the channel 18 therebetween for a purpose to be presently described. The collar 15 is likewise formed with a flange 19 at its end opposite the gear 10, and between the flanges 17 and 19 there is mounted the low speed driving gear 20. This low speed driving gear 20 is mounted on the collar 15 by means of a one-way clutch mechanism of any well known variety illustrated at 21. This one-way clutch mechanism 21 is so arranged that when the jack shaft 11 is turned in a forward direction the gear 20 will be forced to turn as fast as the jack shaft, but regardless of the speed of the jack shaft, the gear 20 may be turned much faster than the jack shaft by virtue of the one-way or overrunning clutch mechanism 21. The gear assembly consisting of the driven gear 10, the reverse driving gear 14, and the low speed driving gear 20 may be shifted longitudinally along the splined shaft 11 for the purpose of changing from low speed to neutral and reverse speed and vice versa as will be later described.

At a point spaced somewhat from the gear assembly just described, there is mounted on the splined shaft 11 a collar having flanges 22 at its opposite end for the purpose of receiving the intermediate speed driving gear 23 therebetween. This intermediate speed driving gear is mounted on the collar between the flanges 22 by means of a one-way clutch mechanism 24 which may be identical in all respects with the clutch mechanism 21.

With reference again to the driven shaft 2, it will be seen that this shaft is provided intermediate its ends with a low and reverse speed driven gear 25 adapted when the gear assembly previously described is in one extreme position to mesh with the low speed driving gear 20. Also constantly in mesh with the low and reverse speed driven gear 25 is a reverse idler gear 26 which is slightly out of line with the low speed driving gear 20 when the latter is in mesh with the driven gear 25. It is noted that the driven gear 25 is wider than either the low speed driving gear 20 or the reverse idler 26. It is also to be noted that the jack shaft driving gear 9 on the driving shaft 1 is considerably wider than the driven gear 10 mounted on the jack shaft 11. It will thus be seen that the gear assembly on the drive shaft may be shifted to its other extreme position and that the gear 10 will remain in mesh with the driving gear 9 but that the low speed driving gear 20 will be taken out of mesh with the low and reverse speed driven gear 25 and the reverse driving gear 14 will be meshed with the reverse idler 26. The low speed and reverse driving gears are so spaced from each other that when in an intermediate position neither will be in mesh with the gear it drives, thereby furnishing a neutral position for this mechanism.

While the low and reverse speed driven gear 25 is fixedly mounted on the shaft 2 between the collars 27, the intermediate speed driven gear 28 is rotatably mounted on this shaft between the collars or flanges 29. With reference to Figure 2, however, it will be seen that the gear 28 is provided with keyways 30 adapted to receive the projection 31 on the key 6 when the driven shaft is operating at the proper speed to be driven through the intermediate speed gears 23 and 28. Likewise, the gear 9 is provided interiorly thereof with keyways 32 adapted to receive the projection 33 on the key 7 when the speed of the driven shaft 2 is sufficiently great to allow it to be driven directly from the driving shaft 1. It will be appreciated in this connection that the one-way clutches 21 and 24 may if desired be associated with the driven gears 25 and 28 respectively instead of the driving gears 20 and 23.

It will be noted from Figures 5, 6 and 7 that the keyways in the driven shaft 2 are of substantially circular formation and are adapted to form complete circles when brought into register with the keyways of the gears 28 and 9. The keys 6 and 7 are so shaped as to normally lie entirely within the keyways in the shaft 2 and permit the gears 28 and 9 to rotate freely upon the shaft 2. These keys are actuated to connect the gear 28 and the gear 9 respectively to the driven shaft 2 at the proper speed by means of a centrifugal governor mechanism generally indicated at 34. The portion 33 of the key 7 is notched at 63 to receive one end of a pin 64 which extends through the opening 65 in the shaft 2. Positioned in the opposite keyway and having a similar notch 66 to receive the other end of the pin 64 is a key 67 which extends only the width of the gear 9. It will be seen that when the key 7 is rotated the key 67 will likewise be rotated in the opposite direction to allow the driven shaft 2 to drive the shaft 1. Key 67 will be rotated back into place by the rotation of the gear 9 when the key 7 is disengaged.

With reference to Figure 5, it will be seen that the centrifugal governor mechanism consists in general of a block or disc 35 mounted to rotate with the shaft 2 and provided with oppositely extending bores 36 and 37 which are slightly offset in opposite directions from the diameter of the disc. The lug 38 of the key 6 and the lug 39 of the key 7 respectively are disposed in line with the bores 36 and 37 so as to be connected on one face thereof by the plungers 40 and 41 respectively, these plungers being slidably mounted within the bores 36 and 37. When in the position illustrated in Figure 5, the portions 31 and 33 of the keys 6 and 7 are so positioned as to lie entirely within the keyways in the shaft 2 and allow the gears 28 and 9 to rotate freely on said shaft. The keys are held in this position by means of springs 42 and 43 bearing against the outer ends of the plungers 40 and 41 respectively and held in place by means of plugs 44 and 45 threadedly engaging the interiors of the respective bores. These plugs 44 and 45 are provided with screw driver slots 46 and are preferably formed hollow so as to allow the extensions 47 and 48 of the plungers 40 and 41 to extend therethrough. These extensions 47 and 48 are provided on their outer ends with balls or weights 49 and 50 respectively so as to cause a greater centrifugal force to be exerted upon the springs 42 and 43 respectively to cause the plungers 40 and 41 to move outwardly.

When the plungers 40 and 41 are forced to move outwardly by centrifugal force as just described, the plungers 51 and 52 which are mounted within the bores 53 and 54 respectively in the shaft 2, are forced outwardly by means of the springs 55 and 56 so as to cause the projections 38 and 39 to swing outwardly and connect the gears 28 and 9 respectively with the shaft 2 for rotation therewith.

It is to be understood from the above, that the strength of the springs 42 and 43 or the size of the weights 49 and 50 may be easily and readily varied for the purpose of predetermining the speed at which the plungers 40 and 41 will move outwardly and hence at which the intermediate and high speed ratios will take effect. The plugs 44 and 45, being provided with screw driver slots 46, may be readily adjusted so as to adjust the tension of the springs 42 and 43 to predetermine the speeds just mentioned. It will readily be seen that the various parts should be so arranged that the plunger 40 adapted to allow the operation of the key 6 by means of the plunger 51 shall move outwardly at a considerably lower speed of the shaft 2 than will the plunger 41. Thus, the intermediate speed driven gear will first be connected to the shaft 2 as the speed increases and as the speed increases still more, the gear 9 will be connected to the shaft 2 thus forming a direct drive from the driving shaft 1 to the driven shaft 2 as previously described.

Mounted upon the shaft 2 between the intermediate speed driven gear and the low speed and reverse driven gear 25 there is provided a slidable collar 57 which is adapted to be slid along the shaft 2 by the same means 58 which is utilized to slide the gear assembly 10, 14, 20. This means 58 consists of a lever pivoted at 59 and having a pair of pins 60 engaging the channel 18 and a pair of pins 61 engaged within the channel of the collar 57.

The shaft 2 is provided between the gears 28 and 25 with a circumferential channel 60 adapted to receive the projections 61 and 62 on the keys 6 and 7 respectively when those keys are in their inoperative position, that is when the intermediate driven gear 28 and the jack shaft driving gear 9 are disconnected from and rotatable with respect to the driven shaft 2. When these keys are moved to their operative position so as to connect these respective gears to the driven shaft 2, the projections 62 and 62a are raised out of the circumferential channel 60 so as to project beyond the normal surface of the shaft 2.

From the above, it will be seen that the gear assembly 10, 14, 20 may only be shifted to engage the reverse gear 14 with the reverse idler 26 when the keys 6 and 7 are in their inoperative position so as to allow the collar 57 to slide over the projections 61 and 62. When these keys are in their operative position these projections will stand out beyond the contour of the shaft 2 and will prevent the sliding of the collar 57 thus preventing the sliding of the gear assembly. Once the gear assembly has been shifted to reverse position, however, the collar 57 will surround the projections 61 and 62 and prevent them from being moved outwardly thus preventing the keys 6 and 7 from being shifted to their operative position. It will thus be clear that neither the gear 28 nor the gear 9 may be operatively connected with the shaft 2 when the gear assembly is in position to engage the reverse gear 14 with the reverse idler 26.

In operation, the gear assembly 10, 14, 20 may be shifted to reverse position as just described while the driven shaft is at rest, or it may be placed in the position illustrated in Figure 1 which is the low speed driving position. It will be noted that in this position all forward speed driving gears are in mesh. As the mechanism starts in the low speed gear ratio, it continues to gain speed until the speed of the driven shaft is such as to cause the plunger 40 to move outwardly due to centrifugal force. When this takes place, the plunger 51 actuated by the spring 53 will cause the projection 38 on the key 6 to move outwardly, thus moving this key to such a position as to cause the projection 31 to engage within a keyway of the gear 28. At this point, the intermediate speed driving gear 23 will begin to drive the shaft 2 to the intermediate speed driven gear 28, and the gear 20 will merely be caused to idle at a greater speed upon its one-way clutch mechanism. The mechanism is now operating in its intermediate speed ratio.

As the speed of the driven shaft 2 is further increased, the centrifugal force will cause the plunger 41 to be moved outwardly against the resistance of the spring 43, thus allowing the plunger 52 to be moved outwardly by the spring 56. This obviously will cause the key 7 to move to operative position at which position the projection 33 will engage in the keyway within the gear 9, thus directly connecting the driving shaft 1 to the driven shaft 2. At this point, the gear mechanism begins to operate at the highest possible speed ratio and thus the low speed driving gear 20 and the intermediate speed driving gear 23 will operate at a speed greater than the drive shaft 11, riding upon their one-way clutch mechanisms 21 and 24 respectively.

Although only one pair of intermediate speed gears are shown herein, it will be appreciated that as many as may be found desirable are to be provided, depending upon the circumstances of each case.

It will be seen from the above that a mechanism has been provided which is not dependent upon the judgment of the operator in which speed ratio it shall be operated, but that its operation is automatically controlled by means of a centrifugal governor mechanism. It is further observed, that all of the gears for all the forward speeds are in mesh at the same time and that there is actually no gear changing or meshing during the forward motion of the driven shaft. At the same time it is noteworthy, that due to the particular arrangement of parts it is impossible to mesh the reverse driving gear 14 with the reverse idler 26 during the forward motion of the driven shaft.

It is to be distinctly understood that numerous changes may be made in the details and arrangement of parts as illustrated by way of example without departing from the spirit or scope of this invention as set forth in the appended claims.

What we claim is:—

1. In a gear mechanism, a driving shaft, a jack shaft, and a driven shaft, a jack shaft driving gear fixedly mounted on said driving shaft, a gear assembly slidably and non-rotatably mounted on said jack shaft and consisting of a driven gear meshing with said jack shaft driving gear for driving said gear assembly and jack shaft from the driving gear, a reverse driving gear, a low speed driving gear, and a one-way clutch mechanism between said low speed driving gear and said driven and reverse driving gears, whereby said low speed driving gear is forced to operate at as great a speed but may operate at a greater speed than said driven and reverse driving gears, an intermediate speed driving gear non-slidably mounted on said jack shaft at a point spaced from said gear assembly, a one-way clutch mechanism between said intermediate speed driving gear and said jack shaft, whereby said intermediate speed driving gear is forced to operate at as great a speed but may operate at a greater speed than said jack shaft, a low speed and reverse driven gear fixedly mounted on said driven shaft and positioned to mesh with the low speed driving gear when said gear assembly on the jack shaft is in one extreme position, a reverse idler gear in mesh with said low speed and reverse driven gear and positioned to mesh with said reverse driving gear when said gear assembly on the jack shaft is in its other extreme position, an intermediate speed driven gear rotatably and non-slidably mounted on said driven shaft in mesh with said intermediate speed driving gear, means movable to connect said intermediate speed driven gear to said driven shaft whereby said driven shaft may be driven therethrough, means movable to directly connect said driving shaft to said driven shaft whereby said driven shaft may be driven directly from said driving shaft, centrifugal governor means on said driven shaft for moving said two last mentioned means in turn, whereby when a predetermined speed is reached said intermediate driven gear will be connected to said driven shaft, and when a greater predetermined speed is reached said driving shaft will be directly connected to said driven shaft, means for sliding said gear assembly on said jack shaft from one extreme position to another to selectively mesh said low speed driving gear with the low speed and reverse driven gear and the reverse driving gear with the reverse idler, and means for preventing the sliding of said gear assembly to mesh said reverse driving gear with said reverse idler when either said intermediate speed driving gear or said driving shaft are directly connected to said driven shaft and for preventing actuation of either of the movable means for connecting the intermediate speed driven gear or the driving shaft to said driven shaft when the reverse driving gear is in mesh with the reverse idler.

2. In a gear mechanism, a driving shaft, a jack shaft and a driven shaft, a jack shaft driving gear on said driving shaft, a driven gear on said jack shaft meshing with said jack shaft driving gear, low speed and reverse driving gears slidably mounted on said jack shaft, said reverse driving gear being non-rotatable with respect to the jack shaft, a one-way clutch mechanism between said low speed driving gear and said jack shaft, an intermediate speed driving gear non-slidably mounted on said jack shaft, a one-way clutch mechanism between said intermediate speed driving gear and said jack shaft, a low speed and reverse driven gear fixedly mounted on said driven shaft and positioned to mesh with the low speed driving gear when said reverse and low speed gears are slid to one extreme position, a reverse idler gear in mesh with said reverse and low speed driven gear and positioned to mesh with said reverse driving gear when said reverse and low speed gears are slid to their other extreme position, an intermediate speed driven gear rotatably and non-slidably mounted on said driven shaft in mesh with said intermediate speed driving gear, means movable to non-rotatably connect said intermediate speed driven gear to said driven shaft, means movable to directly connect said driving shaft to said driven shaft, centrifugal governor means on said driven shaft for moving said two last mentioned means in turn as the speed of the driven shaft is increased to first connect the intermediate speed driven gear and then said driving shaft directly to said driven shaft at predetermined speeds, means for sliding said reverse and low speed driving gears on said jack shaft from one extreme position to another, and means for preventing the reverse driving gear from meshing with the reverse idler when either said intermediate speed driven gear or the driving shaft is directly connected to said driven shaft and for preventing actuation of either of the movable means for connecting the intermediate speed driven gear or the driving shaft to said driven shaft when the reverse driving gear is in mesh with the reverse idler.

3. In a gear mechanism, a driving shaft, a jack shaft and a driven shaft, a jack shaft driving gear on said driving shaft, a driven gear on said jack shaft meshing with said jack shaft driving gear, low speed and reverse driving gears slidably mounted on said jack shaft, said reverse driving gear being non-rotatable with respect to the jack shaft, a one-way clutch mechanism between said low speed driving gear and said jack shaft, an intermediate speed driving gear non-slidably mounted on said jack shaft, a one-way clutch mechanism between said intermediate speed driving gear and said jack shaft, a low speed and reverse driven gear fixedly mounted on said driven shaft and positioned to mesh with the low speed driving gear when said reverse and low speed gears are slid to one extreme position, a reverse idler gear in mesh with said reverse and low speed driven gear and positioned to mesh with said reverse driving gear when said reverse and low speed gears are slid to their other extreme position, an intermediate speed driven gear rotatably and non-slidably mounted on said driven shaft in mesh with said intermediate speed driving gear, means movable to non-rotatably connect said intermediate speed driven gear to said driven shaft, means movable to directly connect said driving shaft to said driven shaft, centrifugal governor means on said driven shaft for moving said two last mentioned means in turn as the speed of the driven shaft is increased to first connect the intermediate speed driven gear and then said driving shaft directly to said driven shaft at predetermined speeds, means for sliding said reverse and low speed driving gears on said jack shaft from one extreme position to another, and means for preventing the reverse driving gear from meshing with the reverse idler when either said intermediate speed driven gear or the driving shaft is directly connected to said driven shaft and for preventing actuation of either of the movable means for connecting the intermediate speed driven gear or the driving shaft to said driven shaft when the reverse driving gear is in mesh with the reverse idler, said governor means being adjustable so as to connect the intermediate speed driven gear and the driving shaft to the driven shaft at any desired predetermined speeds.

4. In a gear mechanism, a driving shaft, a jack shaft and a driven shaft, a jack shaft driving gear on said driving shaft, a driven gear on said jack shaft meshing with said jack shaft driving gear, a reverse driving gear slidably and non-rotatably mounted with respect to said jack shaft, a forward speed driving gear non-slidably mounted on said jack shaft, a one-way clutch mechanism between said forward speed driving gear and said jack shaft, a reverse driven gear fixedly mounted on said driven shaft, a reverse idler gear in mesh with said reverse driven gear, said reverse driving gear being slidable into and out of mesh with said reverse idler, a forward speed driven gear rotatably and non-slidably mounted on said driven shaft in mesh with said forward speed driving gear, means movable to non-rotatably connect said forward speed driven gear to said driven shaft, means movable to directly connect said driving shaft to said driven shaft, centrifugal governor means on said driven shaft for moving said two last mentioned means in turn as the speed of the driven shaft is increased to first connect the forward speed driven gear and then said driving shaft directly to said driven shaft at predetermined speeds, means for sliding said reverse driving gear into and out of mesh with the reverse idler, and means for preventing the reverse driving gear from meshing with the reverse idler when either said forward speed driven gear or the driving gear is directly connected to said driven shaft and for preventing actuation of either of the movable means for connecting the forward speed driven gear or the driving shaft to said driven shaft when the reverse driving gear is in mesh with the reverse idler.

5. In a gear mechanism, a driving shaft, a jack shaft, and a driven shaft, a jack shaft driving gear on said driving shaft, a driven gear on said jack shaft meshing with said jack shaft driving gear, low speed and reverse driving gears slidably mounted on said jack shaft, said reverse driving gear being non-rotatable with respect to the jack shaft, a one-way clutch mechanism between said low speed driving gear and said jack shaft, a low speed and reverse driven gear fixedly mounted on said driven shaft and positioned to mesh with the low speed driving gear when said reverse and low speed gears are slid to one extreme position, a reverse idler gear in mesh with said reverse and low speed driven gear and positioned to mesh with said reverse driving gear when said reverse and low speed gears are slid to their other extreme position, means movable to directly connect said driving shaft to said driven shaft, centrifugal governor means on said driven shaft for moving said last mentioned means to directly connect said driving and driven shafts when the driven shaft attains a predetermined speed, means for sliding said reverse and low speed driving gears on said jack shaft from one extreme position to another, and means for preventing the reverse driving gear from meshing with the reverse idler when said driving shaft is directly connected to said driven shaft and for preventing actuation of the movable means for connecting the driving shaft to the driven shaft when the reverse driving gear is in mesh with the reverse idler.

6. In a gear mechanism, a driving shaft, a jack shaft, and a driven shaft, a jack shaft driving gear on said driving shaft, a driven gear on said jack shaft meshing with said jack shaft driving gear, low speed and reverse driving gears slidably mounted on said jack shaft, said reverse driving gear being non-rotatable with respect to the jack shaft, a one-way clutch mechanism between said low speed driving gear and said jack shaft, an intermediate speed driving gear non-slidably mounted on said jack shaft, a one-way clutch mechanism between said intermediate speed driving gear and said jack shaft, a low speed and reverse driven gear fixedly mounted on said driven shaft and positioned to mesh with the low speed driving gear when said reverse and low speed gears are slid to one extreme position, a reverse idler gear in mesh with said reverse and low speed driven gear and positioned to mesh with said reverse driving gear when said reverse and low speed gears are slid to their other extreme position, an intermediate speed driven gear rotatably and non-slidably mounted on said driven shaft in mesh with said intermediate speed driving gear, means movable to non-rotatably connect said intermediate speed driven gear to the driven shaft, centrifugal governor means on said driven shaft for moving said last mentioned means to non-rotatably connect said intermediate speed driven gear to said driven shaft when the driven shaft attains a predetermined speed, means for sliding said reverse and low speed driving gears on said jack shaft from one extreme position to another, and means for preventing the reverse driving gear from meshing with the reverse idler when said intermediate speed driven gear is non-rotatably connected to said driven shaft and for preventing actuation of the movable means for connecting the intermediate speed driven gear to said driven shaft when the reverse driving gear is in mesh with the reverse idler.

7. In a gear mechanism, a driving shaft, a jack shaft and a driven shaft, a jack shaft driving gear on said driving shaft, a driven gear on said jack shaft meshing with said jack shaft driving gear, low speed and reverse driving gears slidably mounted on said jack shaft, said reverse driving gear being non-rotatable with respect to the jack shaft, a one-way clutch mechanism between said low speed driving gear and said jack shaft, an intermediate speed driving gear non-slidably mounted on said jack shaft, a one-way clutch mechanism between said intermediate speed driving gear and said jack shaft, a low speed and reverse driven gear fixedly mounted on said driven shaft and positioned to mesh with the low speed driving gear when said reverse and low speed gears are slid to one extreme position, a reverse idler gear in mesh with said reverse and low speed driven gear and positioned to mesh with said reverse driving gear when said reverse and low speed gears are slid to their other extreme position, an intermediate speed driven gear rotatably and non-slidably mounted on said driven shaft in mesh with said intermediate speed driving gear, means movable to non-rotatably connect said intermediate speed driven gear to said driven shaft, means movable to directly connect said driving shaft to said driven shaft, centrifugal governor means on said driven shaft for moving said two last mentioned means in turn as the speed of the driven shaft is increased to first connect the intermediate speed driven gear and then said driving shaft directly to said driven shaft at predetermined speeds, means for sliding said reverse and low speed driving gears on said jack shaft from one extreme position to another.

8. In a gear mechanism, a driving shaft, a jack shaft, and a driven shaft, a jack shaft driving gear on said driving shaft, a reverse idler gear, gear means non-rotatably mounted on said jack shaft for meshing with said jack shaft driving gear and with said reverse idler gear, a low speed driving gear on said jack shaft, a one-way clutch mechanism between said low speed driving gear and said jack shaft, a low speed and reverse driven gear non-rotatably mounted on said driven shaft, means movable to directly connect said driving shaft to said driven shaft, centrifugal governor means on said driven shaft for moving said last mentioned means to directly connect said driving and driven shafts when the driven shaft attains a predetermined speed, means for shifting said gears relative to each other to cause said low speed and reverse driven gear to be driven from said jack shaft through said low speed driving gear or through said reverse idler gear to cause a forward or rearward movement of the driven gear as desired, and means for preventing the simultaneous connection of said low speed and reverse driven gear to the jack shaft through said reverse idler gear and of said driven shaft directly to the driving shaft.

9. In a gear mechanism, a driving shaft, and a driven shaft, a series of driving mechanisms for driving said driven shaft at various speeds from said driving shaft, an overrunning clutch in each mechanism except that for driving the driven shaft at the highest speed, whereby the lower speed mechanisms may remain in driving position during the driving of the driven shaft by one of the higher speed mechanisms, means forming an operative connection between the lowest speed mechanism and the driven shaft, a movable key for each of said other mechanisms, said keys being embedded in said driven shaft and arranged for movement to operatively connect and disconnect said other mechanisms respectively to the driven shaft, and centrifugal governor means actuated from said driven shaft for progressively moving said respective movable keys to progressively operatively connect said other mechanisms to the driven shaft as the speed of the driven shaft is increased to predetermined values.

CARTER D. ELLIS.
NORMAN A. PARKER.